Oct. 17, 1933.  R. BERTHON  1,930,550
REPRODUCTION BY CONTACT OF FILMS WITH REFRACTING MICROSCOPIC ELEMENTS
Filed Jan. 5, 1931
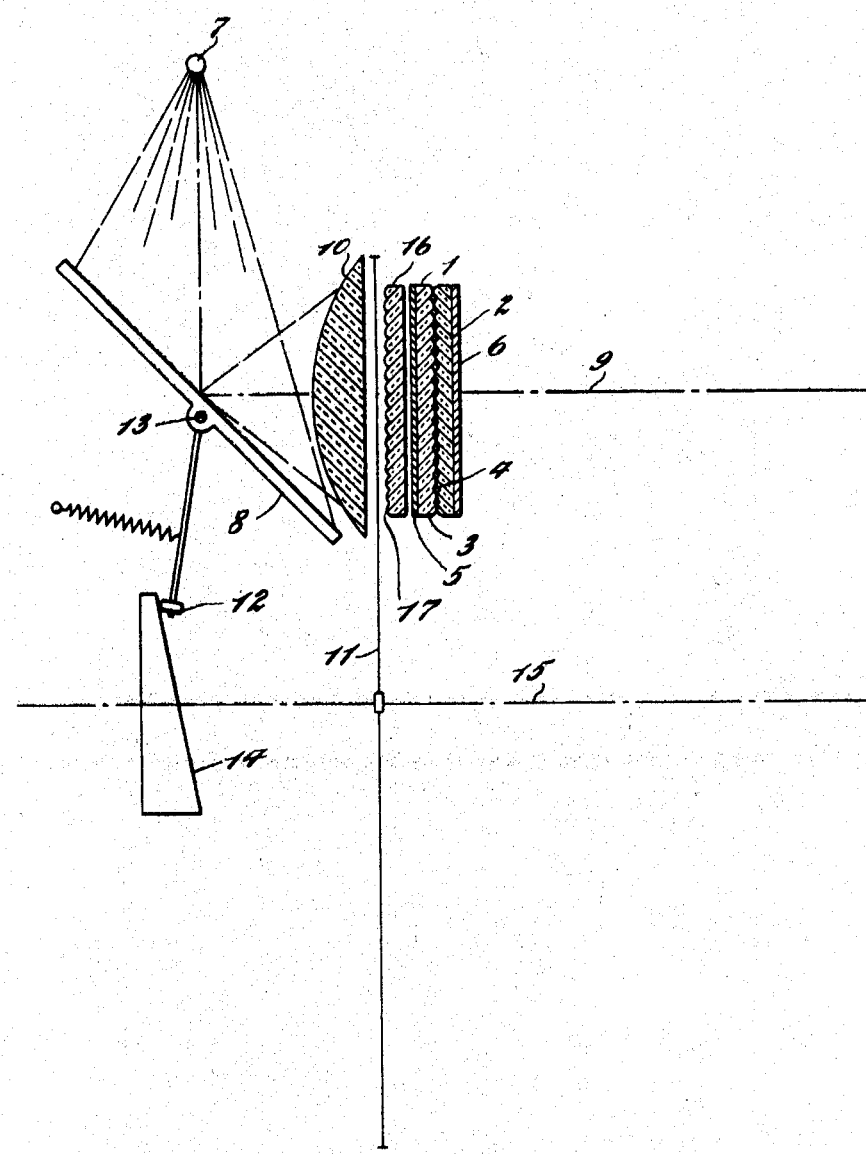
Rodolphe Berthon INVENTOR
BY
Gifford, Scull & Burgess
ATTORNEYS Patented Oct. 17, 1933

1,930,550

UNITED STATES PATENT OFFICE 1,930,550

REPRODUCTION BY CONTACT OF FILMS WITH REFRACTING MICROSCOPIC ELEMENTS

Rodolphe Berthon, Neuilly-sur-Seine, France, assignor to Kislyn Corporation, a corporation of Delaware Application January 5, 1931, Serial No. 506,753, and in France January 7, 1930

4 Claims. (Cl. 95—75)

This invention relates to a novel and improved manner of eliminating the moiré effect in the copying of images from one film to another when the films are of the form referred to, for example, in U. S. Patent 1,807,822. The invention has particular use when employed with an apparatus such as shown in that patent, although I do not intend to limit myself specifically to that apparatus.

Among other things, when printing from one lenticular film onto another it is important that the network of lines printed in the sensitive layer during the luminous impression through the lenticular elements or embossing should not be destroyed at any point by the actual photographic operations of development, reversal and eventual intensification. In fact, the photographic network imprinted in the gelatine bromide layer of the film acts as a veritable guide to the luminous pencil in the phenomenon of the effacement of the moirés or watering. In all the points in which this network is destroyed by the photographic operations, reproduction takes place as if an embossed film deprived of all photographic image had been superimposed on an unexposed embossed film. It is evident that in this case, moirés would make their appearance because the light would have for its source a more or less diffuse surface without any guiding produced by lines printed in the gelatine layer of the original.

The object of the present invention is to provide an improvement in the method forming the subject-matter of the aforementioned patent, and permitting reproduction to be effected even of a film, the photographic network of which has been partly destroyed by the photographic operations. This method is based on the reconstitution, during the operation of reproduction, of a network of luminous lines in the plane of the layer of gelatine of the original film which is to be reproduced. For this purpose, it suffices to interpose between the source of light and the original which is to be reproduced, and substantially in contact with the latter an embossed film deprived of its gelatine and having its embossed face turned towards the source of light. The embossing on this auxiliary film will thus produce in the plane of the photographic image of the film to be reproduced, a veritable network or grating of luminous lines formed by the images of the source through the embossing, the said network of luminous lines sweeping the entire surface of the original photographic print during the oscillation of the luminous pencil as described in the aforementioned patent specification.

The embossed auxiliary film, deprived of its emulsion, may be of the same length as the film which is to be reproduced, or it may be short and form a loop passing continuously, during printing, through the unwiding apparatus of the printing machine, or finally it may be of the size of a single image and may be simply stuck on the window of the printing machine. No precise relationship is necessary between the various films.

In the accompanying drawing is shown one form of apparatus which may be used for the practice of the invention, this apparatus being substantially the same as that illustrated in the aforesaid patent.

The single figure of the drawing is a diagrammatic cross-section taken transversely of the planes occupied by the films.

In the drawing, the numeral 1 designates the original film and the numeral 2 the copy film upon which is to be reproduced the image on the original film. Each of the films 1 and 2 is provided on its face with a multiplicity of minute lenticular elements 3 and 4, these elements being shown greatly exaggerated in size and, as is well known in the art, being on the order of 500 or 700 to the inch. The films are shown as in contact with each other and the faces carrying the lenticular elements are placed adjacent each other, as indicated, the emulsions 5 and 6 being placed on the opposite sides of the respective films.

The numeral 7 denotes a source of light of any suitable character, the light from which strikes a mirror 8 so disposed as to deflect a beam of light through the films 1 and 2, the axis of this beam being designated 9. A suitable lens system, indicated diagrammatically at 10, may be used and also a suitable shutter 11. The mirror 8 may be continuously oscillated in the manner described in the aforesaid patent by means of a cam follower 12 secured to the mirror and adapted to rock it on its pivot 13 under the action of a cam 14 secured on the shutter shaft 15.

Disposed between the source of light, or in this case between the mirror 8 and the original film, is the auxiliary film referred to above and which is indicated at 16. This film has lenticular elements 17 shown as disposed towards the source of light and forms a substantially transparent element between the source of light and the films. As pointed out above, this element may conveniently be made of a film having lenticulations thereon and from which the emulsion has been removed, although, of course, other forms of elements may be used where found convenient.

The element 16 is preferably disposed closely adjacent the emulsion 5 of the film 1 so as to be in substantially the same plane as that emulsion. The lenticular elements are usually in the form of cylindrical lens elements extending lengthwise of the film, and the result will be that the lenticular elements 17 will form a grating upon the emulsion 5 to take the place of any parts of the grating which may have been destroyed by the photographic operations. That is to say, it is well known that in the use of a film of the type shown herein, the film, as a result of the photographic operations which result in the formation of an image thereon, has a grating of different lines forming the different color values; for example, red, green, and blue. These lines, however, are apt to be partly destroyed or reduced to such a size as to be practically non-existent, in places.

By the use of the auxiliary film or other element 16, the light passing to the original film 1 is acted upon by the multiplicity of lenticular elements 17 and caused to form a grating which will supply the partial lack of such a grating on the original film. This grating, formed by the elements 17, will sweep across the original film as stated above, and in this way aid in eliminating the moiré effect.

Of course, it is to be understood that the words "grating" and "network" are to be used interchangeably, the question of whether or not a grating or network occurs, depending upon the form and arrangement of the lenticular elements used on the films.

While I have shown the invention as embodied in a certain form and practiced in a certain manner, it is to be understood that various changes may be made without departing from the spirit or scope of the invention, and I therefore do not intend to limit myself except by the appended claims.

I claim:

1. In combination, an original film and a copy film, each of said films having a multiplicity of lenticular elements on one side thereof and the films being placed substantially in contact with said elements adjacent each other, a source of light so placed as to pass a beam of light first through the original film and then through the copy film, and a substantially transparent element disposed between said source of light and the original film and having thereon a multiplicity of lenticular elements.

2. In combination, an original film and a copy film, each of said films having a multiplicity of lenticular elements on one side thereof and the films being placed substantially in contact with said elements adjacent each other, a source of light so placed as to pass a beam of light first through the original film and then through the copy film, a substantially transparent element disposed between said source of light and the original film and having thereon a multiplicity of lenticular elements, and means for moving said beam of light transversely of said films.

3. The method of printing from an original film on to a copy film, each of which has thereon a multiplicity of fine lenticular elements, which comprises restoring a partially destroyed grating or network on the original film by passing a beam of light through a transparent element which will form a complete grating or network corresponding to that which has been partially destroyed, and then passing said beam of light through said original film and copy film in succession.

4. The method of printing from an original film on to a copy film, each of which has thereon a multiplicity of fine lenticular elements, which comprises restoring a partially destroyed grating or network on the original film by passing a beam of light through a transparent element which will form a complete grating or network corresponding to that which has been partially destroyed, and then passing said beam of light through said original film and copy film in succession while continually moving said beam of light transversely to said films.

RODOLPHE BERTHON.